US011763567B2

(12) United States Patent
Kakino

(10) Patent No.: US 11,763,567 B2
(45) Date of Patent: *Sep. 19, 2023

(54) AUTOMATED STORE SYSTEM AND SERVER

(71) Applicant: TOSHIBA TEC KABUSHIKI KAISHA, Tokyo (JP)

(72) Inventor: Tomonari Kakino, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/826,140

(22) Filed: May 26, 2022

(65) Prior Publication Data

US 2022/0284709 A1    Sep. 8, 2022

Related U.S. Application Data

(63) Continuation of application No. 16/575,189, filed on Sep. 18, 2019, now Pat. No. 11,367,285.

(30) Foreign Application Priority Data

Oct. 9, 2018 (JP) .................................. 2018-190716

(51) Int. Cl.
*G06V 20/52* (2022.01)
*G06F 16/535* (2019.01)
(Continued)

(52) U.S. Cl.
CPC .............. *G06V 20/52* (2022.01); *E05F 3/222* (2013.01); *G06F 16/535* (2019.01); *G06Q 30/02* (2013.01)

(58) Field of Classification Search
CPC ....... G06V 20/52; E05F 3/222; G06F 16/535; G06Q 30/02; G06Q 20/4014; G06Q 20/20;
(Continued)

(56) References Cited

U.S. PATENT DOCUMENTS 6,119,932 A * 9/2000 Maloney ................. G07C 9/257
235/382
7,780,081 B1 * 8/2010 Liang .................. G06Q 30/0633
235/383
(Continued)

FOREIGN PATENT DOCUMENTS

CA    2962648 A1 *  4/2007   ........... G06F 21/606
CA    2664680 A1 *  4/2008   ............ G06Q 20/02
(Continued)

OTHER PUBLICATIONS

Extended European Search Report dated Feb. 17, 2020 in corresponding European Patent Application No. EP19198655.3, 8 pages.
(Continued)

*Primary Examiner* — Mahendra R Patel
(74) *Attorney, Agent, or Firm* — Kim & Stewart LLP

(57) ABSTRACT

A store management server configured to communicate with an alert device installed in a store, includes a network interface and a processor configured to identify a customer entering the store, acquire customer information about the identified customer, detect that the customer is holding a commodity in the store, acquire sales restriction information about the commodity held by the customer, determine whether the customer is eligible to buy the commodity held by the customer based on the acquired customer information and sales restriction information, and control the network interface to transmit, when it is not determined that the customer is eligible to buy the commodity, a first command to an alert device. The first command causes the alert device to output an alert.

18 Claims, 9 Drawing Sheets

(51) Int. Cl.
*E05F 3/22* (2006.01)
*G06Q 30/02* (2023.01)

(58) Field of Classification Search
CPC .......... G07G 1/0036; G07G 1/12; G07G 1/14; G07G 3/00; G07F 9/02; G07F 9/026
USPC .......................................................... 382/103
See application file for complete search history.

(56) References Cited

U.S. PATENT DOCUMENTS

| | | | | |
|---|---|---|---|---|
| 7,866,546 | B1* | 1/2011 | Vance | G07G 1/0009 |
| | | | | 235/383 |
| 8,972,287 | B1* | 3/2015 | Mesaros | G06Q 30/02 |
| | | | | 345/633 |
| 9,754,630 | B2* | 9/2017 | Hanis | G11B 27/28 |
| 9,836,743 | B2* | 12/2017 | Celikyilmaz | G06Q 30/0267 |
| 10,169,768 | B2* | 1/2019 | Dione | G06Q 30/0267 |
| 10,271,017 | B2* | 4/2019 | Tu | G08B 13/19602 |
| 10,339,544 | B2* | 7/2019 | Klima | H04N 7/18 |
| 10,445,725 | B2* | 10/2019 | Tietzen | G07C 9/257 |
| | | | | 235/382 |
| 10,572,476 | B2* | 2/2020 | Skinder | G06F 16/3338 |
| 10,977,487 | B2* | 4/2021 | Burke | A63F 13/60 |
| 2003/0018522 | A1 | 1/2003 | Denimarck et al. | |
| 2005/0040230 | A1* | 2/2005 | Swartz | G07G 1/0072 |
| | | | | 235/383 |
| 2007/0182818 | A1* | 8/2007 | Buehler | G08B 13/19641 |
| | | | | 348/143 |
| 2011/0264581 | A1* | 10/2011 | Clyne | G06Q 20/10 |
| | | | | 705/39 |
| 2012/0206322 | A1* | 8/2012 | Osterhout | G06F 3/005 |
| | | | | 345/8 |
| 2013/0278631 | A1* | 10/2013 | Border | G06Q 30/02 |
| | | | | 345/633 |
| 2015/0029339 | A1* | 1/2015 | Kobres | H04N 7/181 |
| | | | | 348/150 |
| 2015/0317708 | A1* | 11/2015 | Eramian | G06F 3/005 |
| | | | | 345/8 |
| 2016/0019514 | A1 | 1/2016 | Landers, Jr. et al. | |
| 2018/0234496 | A1* | 8/2018 | Ratias | A63F 13/60 |
| 2019/0172039 | A1* | 6/2019 | Kambara | G06Q 20/208 |
| 2019/0221060 | A1* | 7/2019 | Liu | G07C 9/00912 |
| 2020/0013053 | A1* | 1/2020 | Amin | H04L 63/10 |

FOREIGN PATENT DOCUMENTS

| | | | | |
|---|---|---|---|---|
| CN | 102024297 A | * | 4/2011 | ......... G06Q 20/4016 |
| CN | 102024297 A | | 4/2011 | |
| CN | 207855442 U | | 9/2018 | |
| GB | 2575282 A | * | 1/2020 | ............ G06F 16/56 |
| GB | 2575282 A | | 1/2020 | |
| JP | 07-272121 A | | 10/1995 | |
| JP | 2017157216 A | * | 9/2017 | ......... G06K 9/00771 |
| TW | 201108698 A | * | 3/2011 | ............ G06F 21/33 |
| WO | 2007/030168 A1 | | 3/2007 | |
| WO | WO-2007030168 A1 | * | 3/2007 | ......... G06K 9/00718 |
| WO | WO-2014141395 A1 | * | 9/2014 | ............ G06Q 30/06 |
| WO | 2017/150590 A1 | | 9/2017 | |

OTHER PUBLICATIONS

Office Action dated May 19, 2021 in corresponding Chinese Patent Application No. 201910609727.2, 19 pages. (With translation).
European Office Action dated Mar. 16, 2021 in corresponding European Patent Application No. EP19198655.3, 3 pages.

* cited by examiner

| CUSTOMER ID | NAME | AGE | PAYMENT METHOD |
|---|---|---|---|
| 000001 | AAAA | 22 | A METHOD |
| 000002 | BBBB | 16 | B METHOD |
| 000003 | CCCC | 40 | A METHOD |
| . . . | . . . | . . . | . . . |

| COMMODITY CODE | COMMODITY NAME | AGE LIMIT |
| --- | --- | --- |
| 0123456789 | Dddd | NONE |
| 1234567890 | Eeee | 20 YEARS OLD OR OLDER |
| 2345678901 | Ffff | NONE |
| 3456789012 | Gggg | 18 YEARS OLD OR OLDER |
| ... | ... | ... |

FIG. 9

| CUSTOMER ID:123456 | | | |
|---|---|---|---|
| COMMODITY CODE | COMMODITY NAME | QUANTITY | SALES CONDITION (LIMITATION) |
| | | | |

| CUSTOMER ID:123456 | | | |
|---|---|---|---|
| COMMODITY CODE | COMMODITY NAME | QUANTITY | SALES CONDITION (LIMITATION) |
| 0123456789 | Cccc | 1 | NONE |
| 1234567890 | Eeee | 2 | 20 YEARS OLD OR OLDER |
| . . . | . . . | . . . | . . . |

32a

AUTOMATED STORE SYSTEM AND SERVER

CROSS-REFERENCE TO RELATED APPLICATION

This application is a continuation of U.S. patent application Ser. No. 16/575,189, filed Sep. 18, 2019, which is based upon and claims the benefit of priority from Japanese Patent Application No. 2018-190716, filed Oct. 9, 2018, the entire contents of which are incorporated herein by reference.

FIELD

Embodiments described herein relate generally to an automated store system and a server.

BACKGROUND

In recent years, an automated store where a customer can buy commodities without checkout by a cashier has been tested. Such an automated store system identifies customers entering and exiting a store and performs, with a preset checkout method, checkout for the commodities taken out from the store by the customers. However, in the existing automated store system, it is difficult to sell age-limited commodities without confirmation by a store clerk.

DESCRIPTION OF THE DRAWINGS

FIG. 7 is a diagram illustrating a customer database in the automated store system;

FIG. 9 is a diagram illustrating a virtual basket generated by the server in the automated store system;

FIG. 10 is a diagram illustrating an actual example of the virtual basket storing information about commodities to be purchased by a customer

DETAILED DESCRIPTION

Embodiments provide an automated store system and a server that can sell, without attendance by a store clerk, sales-restricted commodities permitted to be sold to only a customer having a specific authority.

According to an embodiment, a store management server configured to communicate with an alert device installed in a store, includes a network interface and a processor configured to identify a customer entering the store, acquire customer information about the identified customer, detect that the customer is holding a commodity in the store, acquire sales restriction information about the commodity held by the customer, determine whether the customer is eligible to buy the commodity held by the customer based on the acquired customer information and sales restriction information, and control the network interface to transmit, when it is not determined that the customer is eligible to buy the commodity, a first command to an alert device. The first command causes the alert device to output an alert.

An embodiment is explained below with reference to the drawings.

Figure 1:
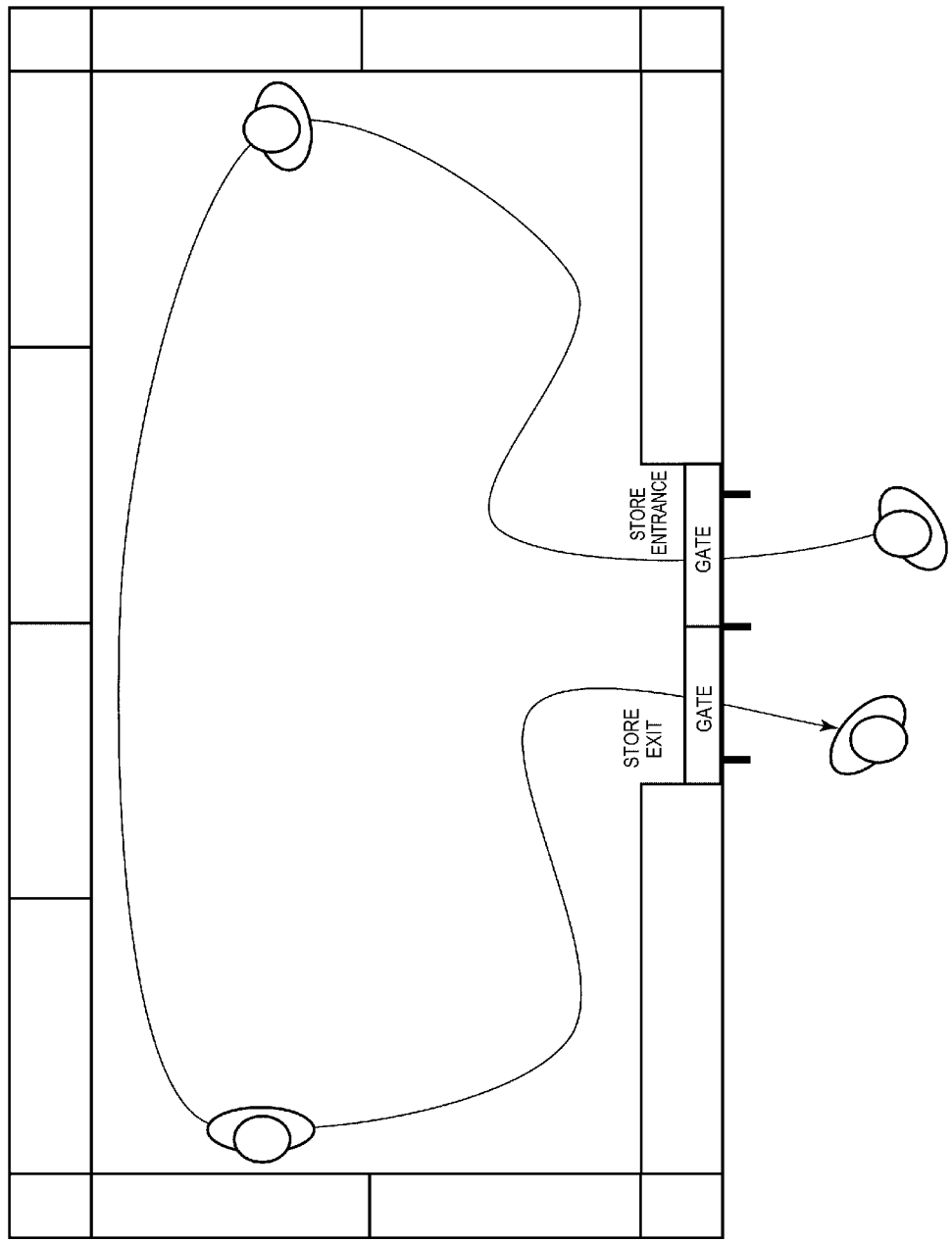
FIG. 1 is a schematic diagram of an automated store system according to an embodiment.

FIG. 1 is a schematic diagram of an automated store system according to an embodiment.

As illustrated in FIG. 1, the automated store system according to this embodiment is installed in a store where a store entrance and a store exit are provided. In the store where the automated store system is installed, a customer enters the store from the store entrance and thereafter takes commodities that the customer desires to purchase in the store, and leaves the store from the store exit. The automated store system executes processing such as store entry processing, monitoring processing, and store leaving processing on customers who visit the store. According to these kinds of processing, the automated store system makes it possible to sell restricted commodities in the store to the customers even if a store clerk is absent in the store.

The store entry processing is processing for identifying, based on customer information registered in advance, a customer who enters the store. The automated store system permits store entry (i.e., passage through the store entrance) of a customer whose customer information is registered.

The monitoring processing is processing for monitoring behavior in the store by the customer who has entered the store. In the monitoring processing, the automated store system detects behavior of the customer with, for example, images photographed by a camera from inside the store. In the monitoring processing, for example, the automated store system specifies a commodity taken by the customer in the store.

The store leaving processing is processing for determining commodities purchased by a customer who is about to leave the store (i.e., commodities taken out from the store by the customer). In the store leaving processing, if all commodities held by the customer who is about to leave the store are commodities that can be sold to the customer, the automated store system determines the commodities as commodities to be purchased by the customer. In the store leaving processing, the automated store system permits the customer having the determined commodities to leave the store (i.e., passage through the exit). Further, the automated store system executes checkout processing for the commodities determined to be purchased by the customer.

Further, the automated store system according to the present embodiment checks whether a commodity held by the customer or a commodity that has been touched by the customer in the store is a commodity that can be sold to the customer. In the present embodiment, the store sells commodities that can be sold without any restriction and commodities that can be sold to only customers satisfying a sales condition such as age or qualification (i.e., customers having a specific authority) (hereinafter sales-restricted commodities). Examples of the sales-restricted commodities include commodities sales-restricted by age such as liquors or tobaccos (i.e., age-limited commodities). The age-limited commodities are commodities that can be sold to only customers in age set as a sales condition and are prohibited to be sold to customers not in the age set as the sales condition. The sales-restricted commodities may be, for example, commodities that can be sold to only customers having preset qualification or authority.

For example, if a customer appears in the store exit holding a sales-restricted commodity not satisfying the sales condition (i.e., a commodity not permitted to be sold to the customer), the automated store system prohibits the customer from leaving the store or outputs an alert. If a customer touches a sales-restricted commodity not satisfying the sales condition (i.e., a commodity not permitted to be sold to the customer), the automated store system may emit an alert.

The configuration of the automated store system according to one embodiment is explained.

Figure 2:
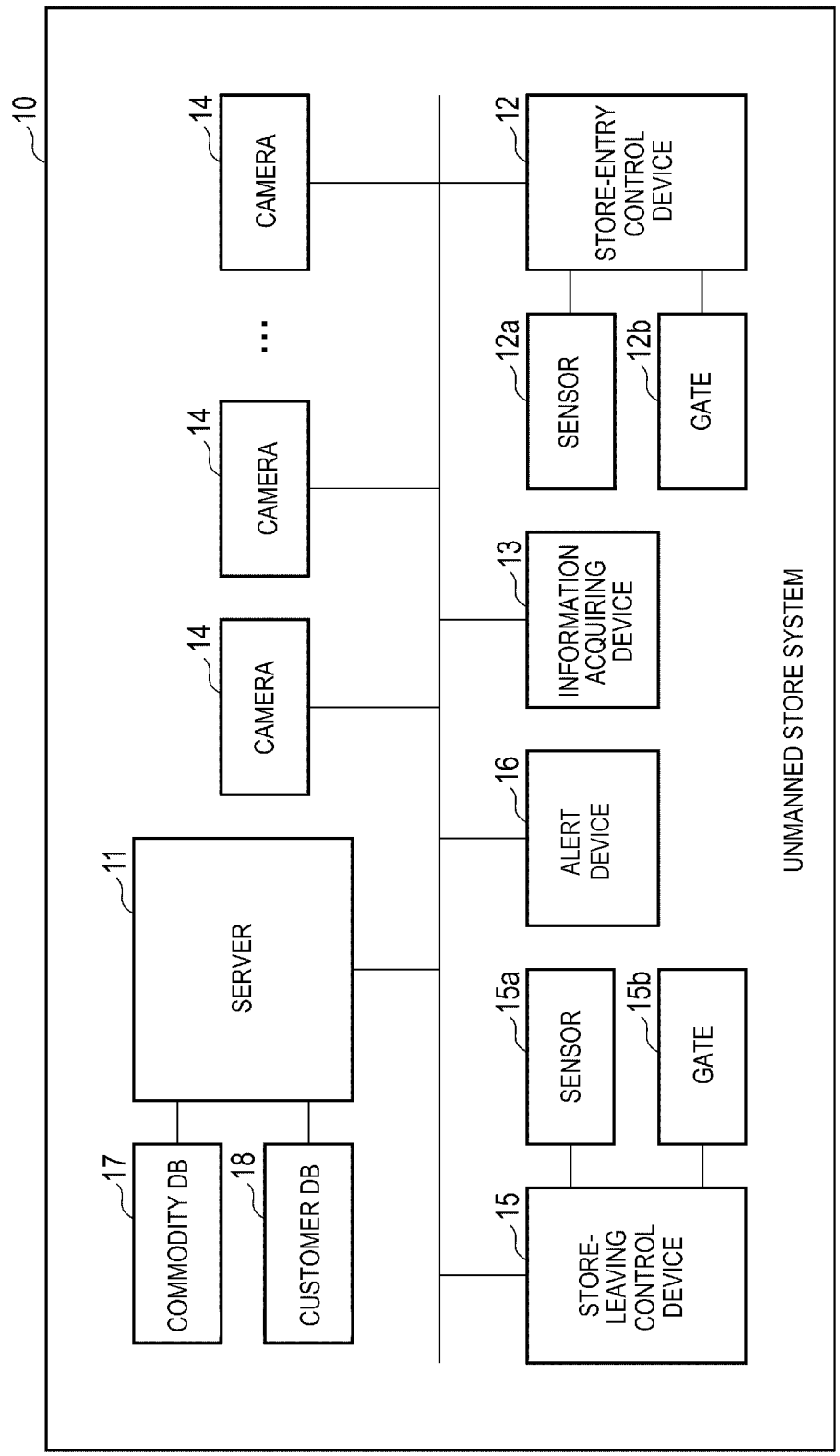
FIG. 2 is a block diagram of the automated store system.

In the configuration example illustrated in FIG. 2, the automated store system 10 includes a server 11, a store-entry control device 12, a sensor 12a, a gate 12b, an information acquiring device 13, one or more cameras 14, a store-leaving control device 15, a sensor 15a, a gate 15b, an alert device 16 (e.g., an alarm), a commodity database 17, and a customer database 18. The sensor 12a and the gate 12b are connected to the store-entry control device 12. The sensor 15a and the gate 15b are connected to the store-leaving control device 15.

The server 11 controls the entire automated store system 10. The server 11 is connected to the store-entry control device 12, the information acquiring device 13, the cameras 14, the store-leaving control device 15, and the alert device 16 via a network. The server 11 executes processing for acquiring information from the devices and selling commodities disposed in the store to customers. The server 11 is connected to a storage device that stores the commodity database 17 and the customer database 18. The server 11 accesses the commodity database 17, the customer database 18, and the like and executes various kinds of processing as appropriate.

The store-entry control device 12 detects a customer at the store entrance and restricts the customer from entering the store. The sensor 12a detects the customer present near the store entrance. For example, the sensor 12a detects the customer approaching the store entrance. The gate 12b provided at the store entrance restricts the customer from entering the store. For example, the store-entry control device 12 opens and closes the gate 12b according to an instruction from the server 11 to thereby restrict the customer detected by the sensor 12a from entering the store.

The information acquiring device 13 acquires information including customer identification information for the customer who is about to enter the store. The information acquiring device 13 transmits the acquired information including the customer identification information to the server 11. The information acquiring device 13 may be connected to the store-entry control device 12 and configured to transmit the information to the server 11 via the store-entry control device 12. In this case, the information acquiring device 13 is capable of acquiring the information according to control by the store-entry control device 12 that can detect the customer present at the store entrance.

The information acquiring device 13 may read the customer identification information from a recording medium (e.g., an IC card, a magnetic card, etc.) presented by the customer or may acquire biological information (e.g., a fingerprint, a face, an iris, etc.) of the customer as the customer identification information. For example, if the information acquiring device 13 is configured to read the customer identification information from the IC card presented by the customer, the information acquiring device 13 controls a card reader to read information from the IC card.

The information acquiring device 13 may acquire the customer identification information from a code displayed or printed on a recording medium presented by the customer (e.g., a two-dimensional code displayed on a portable terminal or a two-dimensional code printed on a sheet). In this case, the information acquiring device 13 controls a code scanner to read a code displayed on the recording medium presented by the customer. If the biological information of the person is acquired as the customer identification information, the information acquiring device 13 controls a scanning device to acquire the biological information from the customer.

In the following explanation, it is assumed that the information acquiring device 13 is a card reader. The information acquiring device 13 reads information including customer identification information from a card presented by the customer at the store entrance. The card read by the information acquiring device 13 may be a contactless IC card, a contact IC card, or a magnetic card including a magnetic storing section.

The cameras 14 photograph the inside of the store. The cameras 14 photograph people present in the store and commodities disposed in the store. Any number of cameras 14 may be set to cover the entire floor of the store. The cameras 14 may move according to the movements of customers in the store.

The store-leaving control device 15 detects the customer leaving from the store at the store exit or gateway. The store-leaving control device 15 is connected to the server 11, the sensor 15a, and the gate 15b. The gate 15b is installed at the store exit. The store-leaving control device 15 opens and closes the gate 15b according to an instruction from the server 11 to restrict the customer from leaving the store. For example, if receiving an instruction to prohibit a customer from leaving the store from the server 11, the store-leaving control device 15 closes the gate 15b and restricts the customer from leaving the store.

The alert device 16 outputs an alert to a customer. The alert device 16 is, for example, a display, a speaker, or the like. The alert device 16 outputs an alert according to an instruction from the server 11. For example, if receiving, from the server 11, an instruction to prohibit a customer present at the store exit from leaving the store, the alert device 16 outputs an alert so that the customer does not leave the store. The display functioning as the alert device 16 displays a message or the like indicating a warning corresponding to the instruction from the server 11. The speaker functioning as the alert device 16 outputs, by sound, a warning or alarm corresponding to the instruction from the server 11.

The alert device 16 may output an alert only to the customer. For example, in an automated store system according to a first operation explained below, the alert device 16 is configured to output the alert to the customer at the store exit. In the first operation explained below, the alert device 16 is provided near the store exit. The alert device 16 may be set on a plurality of places such as a ceiling and a wall in the store. For example, in an automated store system according to a second operation explained below, the alert device 16 is configured to output the alert to the customer present in a position where a sales-restricted commodity is displayed. In the second operation explained below, a plurality of alert devices 16 is set in a plurality of places in the store. If the plurality of alert devices 16 is set in the plurality of places, the server 11 choose one of the alert devices 16 installed at a certain location and control the alert device 16 to output the alert.

The configuration of a control system in the server 11 is explained.

Figure 3:
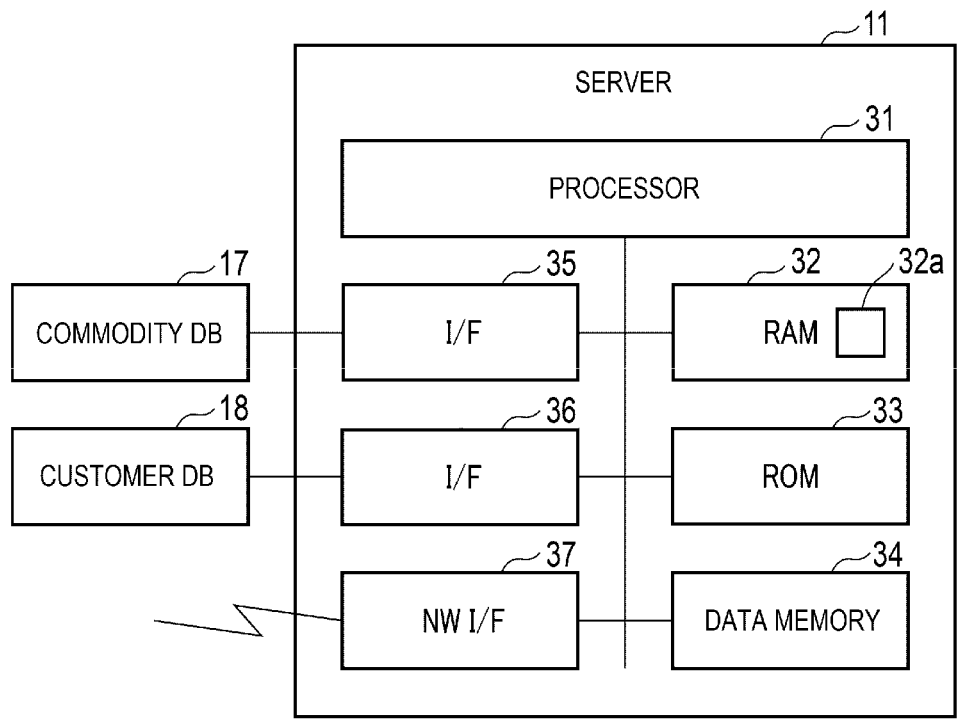
FIG. 3 is a block diagram of a server in the automated store system.

FIG. 3 is a block diagram of the control system in the server 11 according to this embodiment.

In the configuration example illustrated in FIG. 3, the server 11 includes a processor 31, a RAM (random-access memory) 32, a ROM (read-only memory) 33, a data memory 34 (e.g., a storage device), various interfaces (I/Fs) 35 and 36, and a network interface (NW I/F) 37.

The processor 31 executes various kinds of processing by executing computer programs. The processor 31 is, for example, a CPU (central processing unit). The processor 31 performs various processing functions by executing computer programs stored in the ROM 33 or the data memory 34. For example, by executing a computer program for store entry processing, the processor 31 executes store entry processing for restricting a customer from entering the store, via the store-entry control device 12. By executing a computer program for monitoring processing, the processor 31 executes monitoring processing for monitoring behavior of the customer in the store. By executing a computer program for store leaving processing, the processor 31 executes store leaving processing for restricting the customer from leaving the store, via the store-leaving control device 15.

The RAM 32 operates as a working memory. The RAM 32 stores, as appropriate, data referred to by the processor 31 in executing the various kinds of processing, data temporarily used by the processor 31, or the like.

The ROM 33 is a nonvolatile memory and stores computer programs and data. For example, the ROM 33 stores computer programs such as an operating system, middleware, and applications. The ROM 33 may store data referred to by the processor 31 in executing the various kinds of processing.

The data memory 34 is a storage device that stores data. The data memory 34 is a rewritable nonvolatile memory. The data memory 34 is, for example, an HDD (hard disk drive) or an SSD (solid state drive). The data memory 34 stores data used by the processor 31 in executing the various kinds of processing or data generated in the processing by the processor 31. The data memory 34 may store various computer programs to be executed by the processor 31.

The interface 35 is an interface for accessing the commodity database 17. For example, the interface 35 is an interface for communicating with a storage device or a data server that stores the commodity database 17. The commodity database 17 may be stored in the data memory 34.

The interface 36 is an interface for accessing the customer database 18. For example, the interface 36 is an interface for accessing a data server that stores the customer database 18. The customer database 18 may be stored in the data memory 34.

The NW I/F 37 is an interface for communicating with the store-entry control device 12, the information acquiring device 13, the camera 14, the store-leaving control device 15, and the alert device 16 via a network. For example, the server 11 acquires, via the NW I/F 37, an image photographed by the camera 14. The server 11 acquires, via the NW I/F 37, information including customer identification information acquired by the information acquiring device 13. The server 11 outputs, via the NW I/F 37, a control signal for instructing opening and closing of the gate 12b to the store-entry control device 12. The server 11 outputs a control signal for instructing opening and closing of the gate 15b to the store-leaving control device 15 via the NW I/F 37.

The configuration of a control system in the store-entry control device 12 is explained.

Figure 4:
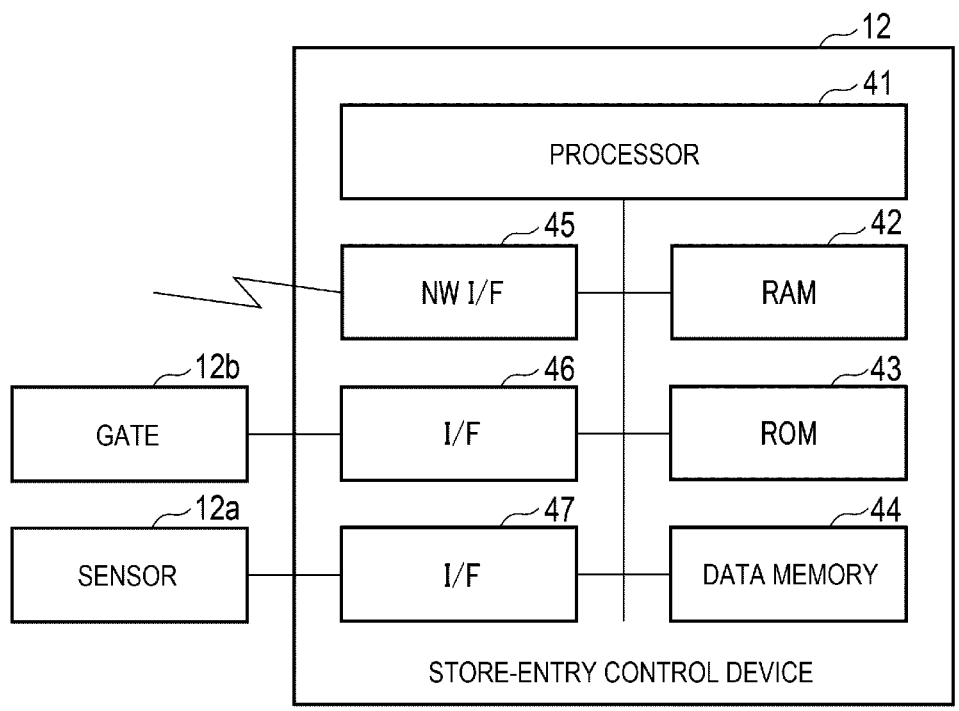
FIG. 4 is a block diagram illustrating a store-entry control device in the automated store system.

FIG. 4 is a block diagram illustrating the control system in the store-entry control device 12 according to this embodiment.

In the configuration example illustrated in FIG. 4, the store-entry control device 12 includes a processor 41, a RAM 42, a ROM 43, a data memory 44, a NW I/F 45, and interfaces (I/Fs) 45 and 46.

The processor 41 executes various kinds of processing by executing computer programs. The processor 41 is, for example, a CPU. The processor 41 performs various processing functions by executing computer programs stored in the ROM 43 or the data memory 44. The processor 41 of the store-entry control device 12 may execute store entry processing explained below in cooperation with the server 11.

The RAM 42 operates as a working memory. The RAM 42 stores, as appropriate, data referred to by the processor 41 in executing the various kinds of processing, data temporarily used by the processor 41, or the like.

The ROM 43 is a nonvolatile memory and stores computer programs and data. For example, the ROM 43 stores computer programs such as an operating system, middleware, and applications. The ROM 43 may store data referred to by the processor 41 in executing the various kinds of processing.

The data memory 44 is a storage device that stores data. The data memory 44 is a rewritable nonvolatile memory. The data memory 44 is, for example, an HDD or an SSD.

The NW I/F 45 is an interface for communicating with the server 11 via a network. For example, the NW I/F 45 acquires a signal for instructing opening and closing of the gate 12b from the server 11.

The interface 46 is an interface for communicating with the sensor 12a. For example, the interface 46 receives information indicating a detection result of a customer from the sensor 12a.

The interface 47 is an interface for communicating with the gate 12b. For example, the interface 47 supplies a signal for controlling opening and closing of the gate 12b to the gate 12b.

The configuration of a control system in the store-leaving control device 15 is explained.

Figures 5, 6:
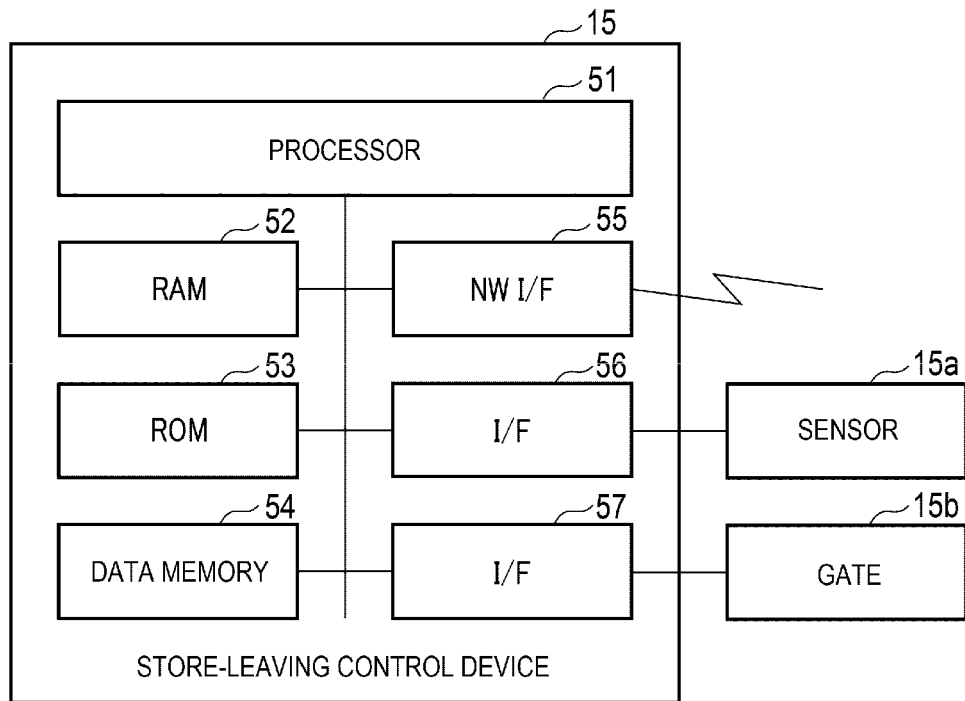
FIG. 5 is a block diagram illustrating a store-leaving control device in the automated store system.
FIG. 6 is a diagram illustrating a commodity database in the automated store system.

FIG. 5 is a block diagram illustrating the control system in the store-leaving control device 15 according to this embodiment.

In the configuration example illustrated in FIG. 5, the store-leaving control device 15 includes a processor 51, a RAM 52, a ROM 53, a data memory 54, a network interface (NW I/F) 55, and interfaces (I/Fs) 56 and 57.

The processor 51 executes various kinds of processing by executing computer programs. The processor 51 is, for example, a CPU. The processor 51 performs various processing functions by executing computer programs stored in the ROM 53 or the data memory 54. The processor 51 of the store-leaving control device 15 may execute store-leaving processing explained below in cooperation with the server 11.

The RAM 52 operates as a working memory. The RAM 52 stores, as appropriate, data referred to by the processor 51 in executing the various kinds of processing, data temporarily used by the processor 51, or the like.

The ROM 53 is a nonvolatile memory and stores computer programs and data. For example, the ROM 53 stores computer programs such as an operating system, middleware, and applications. The ROM 53 may store data referred to by the processor 51 in executing the various kinds of processing.

The data memory 54 is a storage device that stores data. The data memory 54 is a rewritable nonvolatile memory. The data memory 54 is, for example, an HDD or an SSD.

The network interface 55 is an interface for communicating with the server 11 via a network. For example, the network interface 55 receives a signal for instructing opening and closing of the gate 15b from the server 11.

The interface 56 is an interface for communicating with the sensor 15a. For example, the interface 56 receives information indicating a detection result of a customer from the sensor 15a.

The interface 57 is an interface for communicating with the gate 15b. For example, the interface 57 supplies a signal for controlling opening and closing of the gate 15b to the gate 15b.

The customer database 18 in the automated store system is explained.

FIG. 6 is a diagram illustrating a configuration example of the customer database 18.

The customer database 18 stores customer information indicating the sales condition in association with customer identification information for each of customers. The customer database 18 is stored in the storage device accessible from the server 11. In the configuration example illustrated in FIG. 2, the customer database 18 is stored in the external device of the server 11 (e.g., the data server of the customer management system). The customer database 18 may be stored in the storage device (the data memory 34, etc.) in the server 11.

In the configuration example illustrated in FIG. 6, the customer database 18 stores, for each of customers, records each associating customer identification information (e.g., a customer ID) with a name, an age, and a payment method.

The customer identification information uniquely identifies the customers. In the example illustrated in FIG. 6, the customer identification information is a customer ID assigned to each of the customers. In this embodiment, the customer identification information corresponds to the information acquired by the information acquiring device 13. For example, if the information acquiring device 13 is a card reader, the customer identification information is the information read from a card presented by the customer (i.e., information stored in the card of the customer). If the information acquiring device 13 is a device that reads biological information (e.g., a face image, a fingerprint, or a voiceprint) of a customer, the customer identification information is the biological information of the customer. If the information acquiring device 13 is an input device to which information (e.g., a password) is input by operation by a customer, the customer identification information is the password input by the customer.

The name is information indicating the name of the customer. The age is information indicating the age of the customer. For example, the age is used for checking whether the customer is eligible to buy a sales-restricted commodity. Any other information may be used for checking whether the customer is eligible to buy the sales-restricted commodity. That is, the customer database 18 may store, for each of the customers, other information for confirming whether the sales condition for the sales-restricted commodity is satisfied. For example, if a sales-restricted commodity is allowed to be sold to only customers who hold a specific qualification, the customer database 18 stores not only the age of the customer but also information indicating whether the customer holds such aa qualification.

The payment method is information indicating a method for checking out commodities to be purchased by the customer. For example, as the payment method, a checkout method such as a credit card or direct debit may be set. The automated store system according to this embodiment performs, after commodities to be purchased by the customer are determined (i.e., after the customer leaves the store), checkout of the commodities.

The commodity database 17 in the automated store system 10 according to the present embodiment is explained.

FIG. 7 is a diagram illustrating a configuration example of the commodity database 17.

The commodity database 17 stores commodity information indicating sales conditions for commodities displayed in the store. The commodity database 17 is stored in a storage device accessible from the server 11. In the configuration example illustrated in FIG. 2, the commodity database 17 is stored in an external device of the server 11 (e.g., a data server of a customer management system). The commodity database 17 may be stored in a storage device (the data memory 34, etc.) of the server 11.

In the configuration example illustrated in FIG. 7, the commodity database 17 stores, for each of commodities (or types of the commodities), records each associating commodity identification information with a commodity name and a sales condition.

The commodity identification information uniquely specifies a commodity. In the example illustrated in FIG. 7, the commodity identification information is a commodity code represented by a predetermined length of numbers or symbols. The sales condition indicates a condition for selling the commodity. Concerning a commodity without any sales condition (i.e., a commodity without any sales restriction), information indicating that there is no condition for selling the commodity is stored. Concerning a commodity for which some sales condition is set (i.e., a sales-restricted commodity), information indicating a condition for selling the commodity is stored. For example, as the sales condition, the age required to buy the commodity is stored for such a restricted commodity.

The operations of the automated store system including first and second operations are explained.

In the first operation, if a customer leaves the store from the store exit, the automated store system checks whether all commodities held by the customer satisfy each sales condition. If the customer is about to leave the store, the wireless store system outputs an alert if the customer has a commodity not permitted to be sold to the customer.

Figure 8:
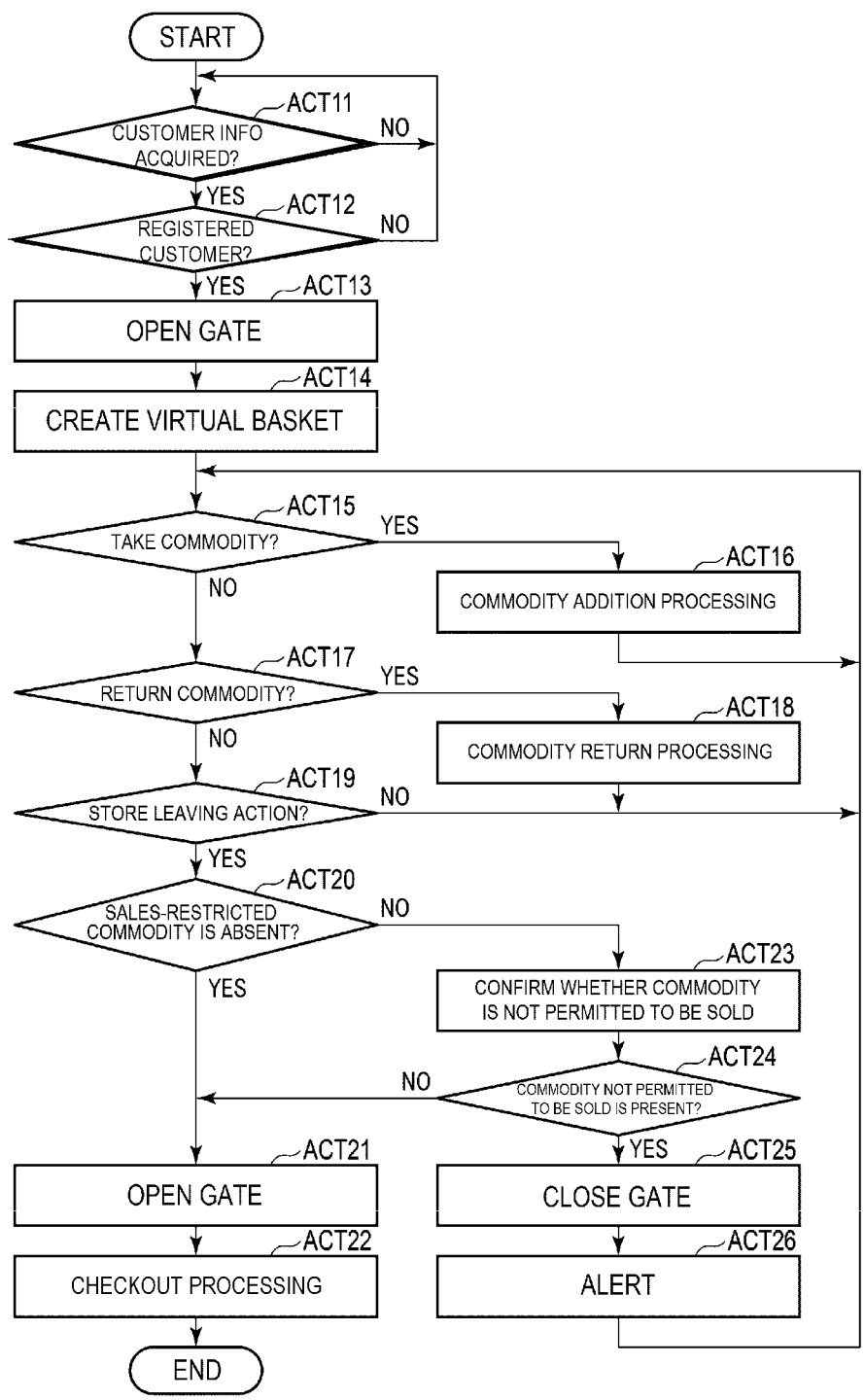
FIG. 8 is a flowchart of a first operation performed by the server in the automated store system.

FIG. 8 is a flowchart for explaining the first operation performed by the server 11 in the automated store system.

At the store entrance, the store-entry control device 12 detects, with the sensor 12a, a customer appearing at the store entrance (or approaching the store entrance). The information acquiring device 13 acquires information concerning the customer who is about to enter the store. The information acquiring device 13 transfers the acquired information concerning the customer to the server 11. For example, the information acquiring device 13 acquires information indicating that the customer is a customer registered in the customer database 18 (i.e., the customer identification information).

For example, in operation for identifying the customer with a customer ID recorded in a storage medium (e.g., an IC card) carried by the customer, the information acquiring device 13 reads the customer ID from the storage medium presented by the store visitor. In operation for identifying the customer with biological information (e.g., a face image, a fingerprint, or a voice print), the information acquiring device 13 acquires the biological information from the customer. In operation for identifying the customer with information (e.g., a password) input by the customer, the information acquiring device 13 accepts and recognizes the information (i.e., the password) input by the customer.

The processor 31 of the server 11 receives, via the NW I/F 37, the information concerning the customer acquired from the customer by the information acquiring device 13 (ACT 11). If receiving the information concerning the customer, the processor 31 of the server 11 determines, based on the received information concerning the customer, whether the customer is registered in the customer database 18 (ACT 12). For example, the processor 31 acquire customer identification information from the information concerning the customer acquired by the information acquiring device 13, and searches the customer database 18 for the acquired customer identification information. If the customer identification information acquired from the information concerning the customer is included in the customer database 18, the processor 3l identifies the customer as a registered customer.

If the customer is registered (YES in ACT 12), the processor 31 controls the gate 12b to open the gate 12b provided at the store entrance (ACT 13). For example, the processor 31 supplies a control command for opening the gate 12b to the store-entry control device 12 via the NW I/F 37. The store-entry control device 12 restricts the customer detected by the sensor 12a from entering the store while keeping the gate 12b closed and opens the gate 12b according to an opening instruction from the server 11. Consequently, the processor 31 can allow the registered customer to enter the store.

If the customer is registered (YES in ACT 12), the processor 31 creates a virtual basket for the customer that stores information concerning a commodity to be purchased by the customer (ACT 14). For example, the processor 31 allocates in the RAM 32 a storage region 32a of the virtual basket for the customer. Every time the processor 31 detects that the customer takes a commodity in the store, the processor 31 stores the information indicating the commodity in the virtual basket (i.e., the storage region 32a). If detecting that the customer returns a commodity, the processor 31 deletes information indicating the returned commodity from the virtual basket (i.e., the storage region 32a).

FIG. 9 is a diagram illustrating an example of a structure of the virtual basket generated for each of customers present in the store. FIG. 10 shows an actual example of the virtual basket that stores information about commodities to be purchased by a customer.

If a customer enters the store, the processor 31 generates, in the RAM 32, the virtual basket (i.e., the storage region 32a) for the customer illustrated in FIG. 9. If the customer holds a commodity displayed in the store, as illustrated in FIG. 10, the processor 31 stores information indicating the commodity in the virtual basket for the customer. If the customer returns the commodity once held by the customer in the store, the processor 31 deletes the information indicating the commodity from the virtual basket for the customer.

In the examples illustrated in FIGS. 9 and 10, the virtual basket is configured to store information indicating commodities to be purchased in a list format. In the virtual basket illustrated in FIGS. 9 and 10, a customer ID is stored as customer identification information for identifying a customer. The virtual basket stores information concerning commodities held by the customer. As the information concerning the commodities held by the customer, the virtual basket stores, concerning the individual commodities, information indicating a commodity code, a commodity name, a quantity, and a sales condition (or restriction).

The commodity code is commodity identification information for uniquely specifying a commodity (or a type of the commodity). The commodity name is a name given to the commodity. The quantity indicates the number of the commodities (or commodities of the same type) held by the customer. The sales condition is information indicating a condition of a customer to whom the commodity can be sold. For example, if the commodity is not a sales-restricted commodity (i.e., a commodity not restricted to be sold), the sales condition is stored as "none". If the commodity is a sales-restricted commodity, the sales condition indicates a condition (e.g., age limit, etc.) to whom sales of the commodity is permitted.

The processor 31 performs monitoring processing for monitoring behavior of the customer in the store (i.e., customer behavior recognition processing). For example, the processor 31 detects with the monitoring processing that, as the behavior of the customer in the store, the customer takes a commodity, the customer returns a commodity, and the customer is about to leave the store. The processor 31 may execute the monitoring processing as a process separate from the other processing, such as the store entry processing and the store leaving processing.

In the monitoring processing, the processor 31 monitors, based on one or more images or a video taken by the camera 14, whether the customer takes a commodity displayed in the store (ACT 15). For example, if the processor 31 detects from the video that the customer puts a commodity in his real basket in the store (e.g., a bag or a cart), the processor 31 considers that the customer takes the commodity. Alternatively, if the processor 31 detects from the video that the customer picks up a commodity in the store and moves, the processor 31 may consider that the customer takes the commodity.

If detecting that the customer takes a commodity (YES in ACT 15), the processor 31 specifies the commodity taken by the customer. For example, the processor 31 specifies the commodity taken by the customer by recognizing the commodity from the images taken by the camera 14. The processor 31 may specify the commodity according to a display location of the commodity taken by the customer. The processor 31 may specify the commodity taken by the customer concurrently using a sensor or the like that detects the commodity displayed at a predetermined location.

After specifying the commodity taken by the customer, the processor 31 acquires information concerning the commodity taken by the customer from the commodity database 17. After acquiring information concerning the commodity taken by the customer, the processor 31 stores the information indicating the commodity taken by the customer in the virtual basket (i.e., the storage region 32a) (ACT 16). In the first operation, the processor 31 stores, as the information indicating the commodity taken by the customer, information indicating a sales condition for the commodity in the virtual basket as well. For example, as illustrated in FIG. 10, the processor 31 stores in the virtual basket a sales condition for a sales-restricted commodity, and stores "none" for a commodity that is not a sales-restricted commodity.

In the monitoring processing, the processor 31 monitors, based on, for example, one or more images or a video taken by the camera 14, whether the customer returns a commodity once taken by the customer in the store (ACT 17). For example, if the processor 31 detects, from the video, the customer's behavior or a motion to return a commodity to the original location, the processor 31 considers that the customer returns the commodity. If the processor 31 confirms that the customer takes out a commodity from the customer's basket or bag and places the commodity at the original location in the store, the processor 31 may consider that the customer returns the commodity.

If detecting that the customer returns the commodity (YES in ACT 17), the processor 31 executes commodity return processing for the commodity returned by the customer (ACT 18). As the commodity return processing, the processor 31 specifies the commodity returned by the customer. After specifying the commodity returned by the customer, as the commodity return processing, the processor 31 deletes information indicating the commodity returned by the customer from the virtual basket for the customer. For example, the processor 31 specifies the commodity returned by the customer by performing image recognition on the images or video taken by the camera 14. The processor 31 may specify the commodity returned by the customer based on display locations of commodities in the store. The processor 31 may specify the commodity returned by the customer concurrently using a sensor that detects a commodity at a predetermined display location.

In the monitoring processing, the processor 31 monitors, based on, for example, the images or video taken by the camera 14, whether the customer is about to leave the store (i.e., perform a store leaving action) (ACT 19). For example, if the customer moves to the store exit, the processor 31 considers that the customer is about to leave the store. If the sensor 15a provided at the store exit detects the customer, the processor 31 may consider that the customer is about to leave the store.

If detecting that the customer is about to leave the store (YES in ACT 19), the processor 31 checks commodities that the customer is about to take out from the store. First, the processor 31 determines whether the customer about to leave the store is holding one or more sales-restricted commodities (ACT 20). For example, the processor 31 determines whether information indicating sales-restricted commodities is stored in the virtual basket (the storage region 32a) for the customer. If the information indicating sales-restricted commodities is stored in the virtual basket for the customer, the processor 31 determines that the customer is holding sales-restricted commodities.

If the customer is not holding any sales-restricted commodity (YES in ACT 20), the processor 31 controls the gate 15b to open the gate 15b provided at the store exit (ACT 21). For example, the processor 31 supplies a control signal for opening the gate 15b (i.e., an opening signal) to the store-leaving control device 15. The store-leaving control device 15 receives the control signal from the server 11 with the NW I/F 55. The processor 51 of the store-leaving control device 15 controls the gate 15b to open according to the opening signal from the server 11. Consequently, the customer is permitted to pass through the store exit and leave the store. If the processor 31 permits the customer to leave the store, the processor 31 may inform, using the alert device 16 connected via the NW I/F 37, guidance indicating that the customer is permitted to leave the store.

After permitting the customer to leave the store (ACT 21), the processor 31 executes checkout processing for commodities present in the virtual basket for the customer (ACT 22). After confirming that a commodity not permitted to be sold to the customer is absent in the virtual basket for the customer leaving the store, the processor 31 executes the checkout processing. The processor 31 may execute the checkout processing any time after confirming that the customer leaving the store is not holding the commodity not permitted to be sold. For example, after the customer has left the store, the processor 31 executes the checkout processing with a payment method set for the customer in the customer database 18 in advance (e.g., a credit card or a direct debit). Consequently, even in a store where ales-restricted commodities are displayed and sold, it is possible to automate the checkout process without attendance of a store clerk.

If the customer is holding sales-restricted commodities (NO in ACT 20), the processor 31 determines whether a commodity not permitted to be sold to the customer is present among the sales-restricted commodities held by the customer (ACT 23). For example, the processor 31 determines whether the customer is permitted to buy each of the sales-restricted commodities held by the customer. That is, if a commodity, whose sales condition is not satisfied for the customer, is present among the sales-restricted commodities held by the customer, the processor 31 determines that a commodity not permitted to be sold is present.

If a commodity not permitted to be sold to the customer is present (YES in ACT 24), the processor 31 performs control for prohibiting passage through the store exit of the customer (ACT 25). For example, the processor 31 outputs a control signal for closing the gate 15b to the store-leaving control device 15 (i.e., a closing signal). The store-leaving control device 15 receives the control signal from the server 11 via the NW I/F 55. The processor 51 of the store-leaving control device 15 controls the gate 15b to close according to the closing signal from the server 11. Consequently, the customer holding the commodity not permitted to be sold is prohibited from passing through the store exit and cannot leave the store.

If a commodity not permitted to be sold to the customer is present (YES in ACT 24), the processor 31 control the alert device 16 to output an alert (ACT 26). The processor 31 informs via the alert device 16 that the commodity not permitted to be sold to the customer is present among commodities held by the customer (i.e., commodities present in the virtual basket). For example, the processor 31 controls the alert device 16 having a speaker to output alarm sound and/or control the alert device 16 having a display to display an image of the commodity not permitted to be sold to the customer. The processor 31 may inform, via the alert device 16, guidance that the customer should return the commodity not permitted to be sold.

After closing the gate 15b and outputting the alert, the processor 31 continues the monitoring processing for the customer. That is, after outputting the alert for informing that the commodity not permitted to be sold is present, the processor 31 returns to ACT 15 and detects addition of a commodity, return of a commodity, store leaving action, and the like. If the customer returns the commodity not permitted to be sold, the processor 31 executes return processing for the commodity. If the commodity not permitted to be sold is absent in the virtual basket as a result of the return processing, the processor 31 proceeds to ACT 21 and permits the customer to leave the store.

If the customer is not holding a commodity not permitted to be sold (YES in ACT 20 and NO in ACT 24), the processor 31 controls the gate 15b to open (ACT 21) and executes the checkout processing (ACT 22). As explained above, the processor 31 executes the checkout processing after confirming that a sales-restricted commodity prohibited from being sold to the customer is absent in commodities carried away from the store by the customer leaving the store.

As explained above, the server 11 that performs the first operation confirms that a sales-restricted commodity not permitted to be sold to the customer is absent in the virtual basket before the customer leaves the store. If the customer who is about to leave the store holds a sales-restricted commodity not permitted to be sold, the server 11 controls the gate 15*b* at the store exit to close and prohibits the customer from leaving the store. The server 11 prohibits the customer holding the sales-restricted commodity not permitted to be sold from leaving the store and outputs an alert for urging the customer to return the sales-restricted commodity not permitted to be sold. If confirming that the customer is no longer holding the commodity not permitted to be sold, the server 11 controls the gate 15*b* to open to let the customer leave the store, and executes the checkout processing.

Consequently, the server 11 and the automated store system can prevent a customer not satisfying a sales condition from taking out a sales-restricted commodity (e.g., an age-limited commodity not permitted to be sold due to the age of the customer) to the outside of the store. As a result, automated checkout without attendance of any store clerk can be done even in a store where commodities including sales-restricted commodities are sold.

A second operation performed by the automated store system is explained.

In the second operation, if a customer touches a commodity (or picks up a commodity) in the store, the automated store system checks whether the customer satisfies a sales condition for the touched commodity. In the second operation, if the customer does not satisfy the sales condition for the touched commodity (i.e., if the customer touches a sales-restricted commodity not permitted to be sold), the automated store system outputs an alert.

Figure 11:
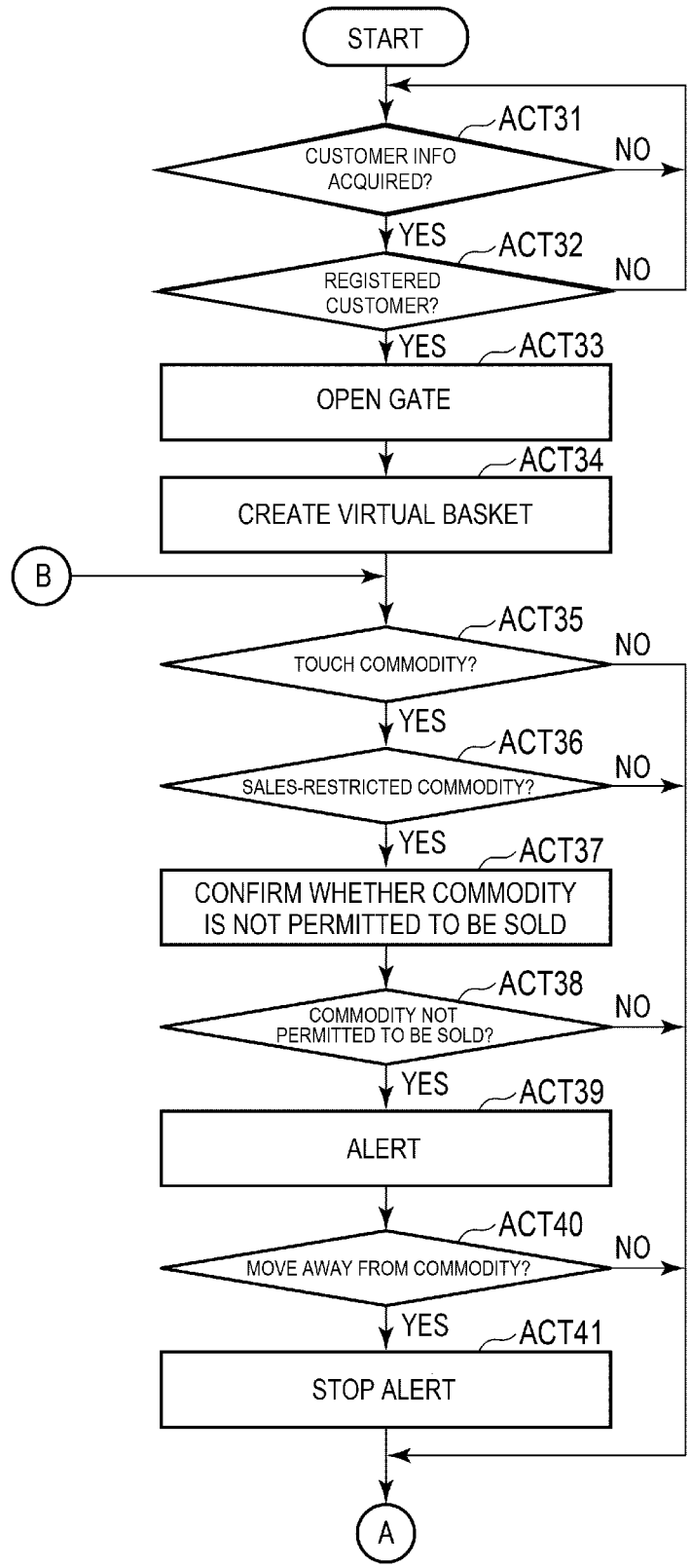
FIG. 11 is a flowchart of a second operation performed by the server in the automated store system.
Figure 12:
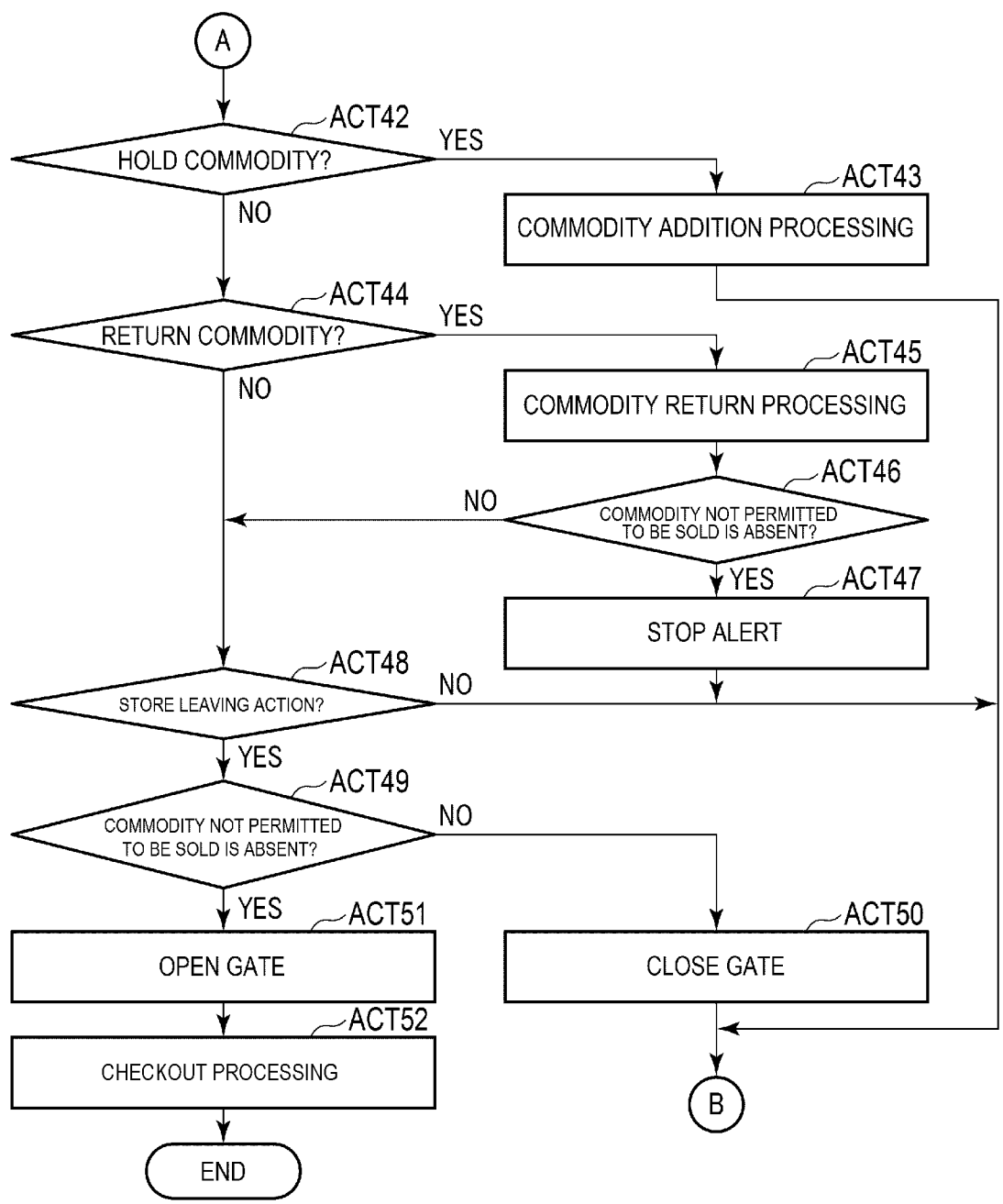
FIG. 12 is a flowchart of the second operation performed by the server in the automated store system.

FIGS. 11 and 12 are flowcharts for explaining the second operation performed by the server 11 in the automated store system.

In the second operation, as in ACTS 11 to 14 explained in the first operation example, the processor 31 of the server 11 executes the store-entry processing on a customer entering the store (ACTS 31 to 34). That is, the processor 31 of the server 11 receives, from the information acquiring device 13 located at the store entrance, information concerning the customer acquired from the store visitor (ACT 31). The processor 31 of the server 11 determines, based on the information concerning the customer acquired by the information acquiring device 13, whether the customer is a customer registered in the customer database 18 (ACT 32). If the customer is registered (YES in ACT 32), the processor 31 controls the gate 12*b* to open (ACT 33) and generates a virtual basket for the customer (ACT 34).

After permitting the customer to enter the store, the processor 31 performs monitoring processing for monitoring behavior of the customer in the store. In the monitoring processing in the second operation, the processor 31 detects that the customer touches a commodity in the store (ACT 35). For example, the processor 31 detects based on one or more images or a video taken by the camera 14 that the customer touches a commodity in the store.

If detecting that the customer touches a commodity (YES in ACT 35), the processor 31 specifies the commodity touched by the customer. After specifying the commodity touched by the customer, the processor 31 determines whether the commodity touched by the customer is a sales-restricted commodity (ACT 36). For example, the processor 31 specifies the commodity touched by the customer by performing image recognition on the images or video taken by the camera 14. The processor 31 may specify the commodity by specifying the display location of the commodity touched by the customer.

If the commodity touched by the customer is not a sales-restricted commodity (NO in ACT 36), the processor 31 proceeds to ACT 42.

If the commodity touched by the customer is a sales-restricted commodity (YES in ACT 36), the processor 31 determines whether the sales-restricted commodity touched by the customer is a commodity not permitted to be sold to the customer (ACT 37). The processor 31 determines whether the customer satisfies a sales condition for the sales-restricted commodity touched by the customer. If the customer does not satisfy the sales condition for the sales-restricted commodity touched by the customer, the processor 31 determines that the customer touches a commodity not permitted to be sold to the customer.

If determining that the customer touches a sales-restricted commodity not permitted to be sold (YES in ACT 38), the processor 31 controls the alert device 16 to output an alert (ACT 39). In the second operation, it is assumed that the alert device 16 outputs the alert to customers present in the store. Therefore, in the automated store system performing the second operation, a plurality of alert devices may be installed at different locations (e.g., a wall and a ceiling) in the store. In such a configuration, the processor 31 controls one of the alert devices near the commodity touched by the customer to output the alert.

The alert is an alert for informing a warning to the customer. For example, the alert may be an alert for outputting alarm sound to the customer or may be an alert for displaying guidance indicating that a commodity not permitted to be sold is returned. Consequently, if the customer touches a sales-restricted commodity not permitted to be sold in the store, it is possible to provide the customer with a timely alert.

The processor 31 continues the monitoring processing until the customer leaves the store. For example, even after the processor 31 outputs an alert for informing that a commodity not permitted to be sold is present, the processor 31 continues the monitoring processing until the customer leaves the store. If the processor 31 control the alert device 16 to output the alert to the customer who touches the commodity not permitted to be sold, the processor 31 detects, with the monitoring processing, whether the customer moves away from the sales-restricted commodity not permitted to be sold.

If the customer does not move away from the sales-restricted commodity not permitted to be sold (NO in ACT 40), the processor 31 proceeds to ACT 42 and continues the monitoring processing while continuing the alert. If the customer moves away from the sales-restricted commodity not permitted to be sold (YES in ACT 40), the processor 31 controls the alert device 16 to stop the alert (ACT 41) and proceeds to ACT 42. Therefore, if the customer touching the commodity not permitted to be sold immediately moves away from the commodity according to the alert, the alert immediately stops. Consequently, in the second operation, it is possible to immediately output an alert and call attention if the customer touches the sales-restricted commodity not permitted to be sold.

With the monitoring processing, the processor 31 monitors that the customer holds a commodity, returns a commodity, and takes store leaving action. If detecting with the monitoring processing that the customer holds a commodity (YES in ACT 42), the processor 31 specifies the commodity held by the customer. For example, if detecting from the images or video taken by the camera 14 that the customer stores a commodity in his basket, bag, shopping cart, or the like, the processor 31 determines that the customer holds the commodity. Alternatively, if detecting from the images or video that the customer holds a commodity and moves, the processor 31 may determine that the customer holds the commodity.

After specifying the commodity held by the customer, the processor 31 acquires information concerning the commodity held by the customer from the commodity database 17. After acquiring the information concerning the commodity held by the customer, the processor 31 stores the information concerning the commodity held by the customer in the virtual basket (i.e., the storage region 32a) (ACT 43).

The processor 31 monitors, with the monitoring processing, whether the customer returns a commodity once taken by the customer in the store (ACT 44). For example, the processor 31 detects from the images or video taken by the camera 14 that the customer returns the commodity once taken by the customer. If detecting that the customer returns the commodity (YES in ACT 44), the processor 31 executes commodity return processing involved in the return of the commodity by the customer (ACT 45).

As the commodity return processing, the processor 31 specifies the commodity returned by the customer. For example, the processor 31 specifies the commodity returned by the customer by performing image recognition on the images or video taken by the camera 14. The processor 31 may specify the commodity returned by the customer based on the customer's location and the display location of the commodity in the store. The processor 31 may specify the commodity returned by the customer concurrently using a sensor that detects the commodity at a predetermined display location and outputs a signal. After specifying the commodity returned by the customer, the processor 31 deletes information indicating the commodity returned by the customer from the virtual basket.

After executing the commodity return processing, the processor 31 checks whether a sales-restricted commodity not permitted to be sold is absent among commodities held by the customer (ACT 46). For example, the processor 31 checks whether a sales-restricted commodity not permitted to be sold remains in the virtual basket of the customer. If the customer does not hold a sales-restricted commodity not permitted to be sold (YES in ACT 46), the processor 31 controls the alert device 16 to stop the alert (ACT 47). The processor 31 may execute the processing in ACTS 46 and 47 if the alert is generated.

The processor 31 monitors based on, for example, one or more images or a video taken by the camera 14 whether the customer is about to leave the store (i.e., perform the store leaving action) (ACT 48). For example, the processor 31 considers that the customer is about to leave the store if the customer moves to the store exit. The processor 31 may consider that the customer is about to leave the store if the sensor 15a provided at the store exit detects the customer.

If detecting that the customer is about to leave the store (i.e., perform the store leaving action) (YES in ACT 19), the processor 31 checks whether the customer is not holding a sales-restricted commodity not permitted to be sold (ACT 49). For example, the processor 31 determines whether a sales-restricted commodity not permitted to be sold is present in the virtual basket (i.e., the storage region 32a) for the customer. The processor 31 may determine, according to whether an alert is being output to the customer, the customer is holding a sales-restricted commodity not permitted to be sold.

If determining that the customer is holding a sales-restricted commodity (NO in ACT 49), the processor 31 controls the gate 15b installed at the store exit to close (ACT 50). In this case, the processor 31 controls the alert device 16 to continue to output the alert to the customer. Therefore, the alert is output for the customer still holding the sales-restricted commodity not permitted to be sold. Further, the customer is prohibited from passing through the store exit.

If the processor 31 controls the gate 15b to close and prohibits the customer from leaving the store, the processor 31 continues the monitoring processing for the customer. That is, the processor 31 controls the alert device 16 to continue to output the alert for informing that a commodity not permitted to be sold is present, and wait for return of the commodity. If the customer returns all sales-restricted commodities not permitted to be sold, the processor 31 executes return processing for the commodities and control the alert device 16 to stop the alert.

If the customer is not holding any sales-restricted commodity (YES in ACT 49), the processor 31 controls the gate installed at the store exit 15b to open (ACT 51). After permitting the customer to leave the store, the processor 31 determines commodities purchased by the customer and executes checkout processing (ACT 52). For example, the processor 31 executes the checkout processing for commodities present in the virtual basket for the customer permitted to leave the store. The checkout processing may be the same as the processing explained in the first operation.

As explained above, in the second operation, the server 11 outputs an alert if the customer touches a commodity not permitted to be sold in the store. Further, if the customer holding a sales-restricted commodity not permitted to be sold is about to leave the store, the server 11 closes the gate of the store exit and prohibits the customer from leaving the store. Consequently, at a point in time when the customer touches the sales-restricted commodity not permitted to be sold, the server 11 can inform the customer that the commodity is not permitted to be sold. As a result, even in a store where commodities including sales-restricted commodities are sold, automated checkout can be done without attendance of any store clerk.

The several embodiments are explained above. However, the embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A store management server configured to communicate with an alert device installed at a first gate in a store, the server comprising:
    a network interface; and
    a processor configured to:
        identify a customer entering the store,
        acquire customer information about the identified customer,
        detect that the customer is holding a commodity in the store,
        acquire sales restriction information about the commodity held by the customer, determine whether the customer is eligible to buy the commodity held by the customer based on the acquired customer information and sales restriction information, and control the network interface to transmit, when it is not determined that the customer is eligible to buy the commodity, a first command to an alert device, wherein the first command causes the alert device to output an alert.

2. The store management server according to claim 1, wherein the processor is further configured to control the network interface to transmit, when it is not determined that the customer is eligible to buy the commodity, a second command to a first gate control device, and the second command causes the first gate control device to close the first gate.

3. The store management server according to claim 2, wherein the processor is further configured to:

store, in a memory, information about the commodity held by the customer, control the network interface to transmit, when it is determined that the customer is eligible to buy the commodity, a third command to the first gate control device, the third command causing the first gate control device to open the first gate, and after the first gate is opened, perform a checkout process based on the information stored in the memory.

4. The store management server according to claim 2, wherein the first gate is located at an exit of the store, and the processor is further configured to:

detect the customer approaching the exit of the store, and control the network interface to transmit, when the customer approaches the exit, the first and second commands to the alert device and the first gate control device, respectively.

5. The store management server according to claim 4, wherein the processor is further configured to, when failing to acquire the customer information about the detected customer, control the network interface to transmit a fourth command to a second gate control device, and the fourth command causes the second gate control device to close a second gate in the store.

6. The store management server according to claim 5, wherein the second gate is located at an entrance of the store.

7. The store management server according to claim 1, wherein the first command causes the alert device to output the alert on a display.

8. The store management server according to claim 1, wherein the first command causes the alert device to output the alert from a speaker.

9. The store management server according to claim 1, wherein the alert device is installed on a wall or a ceiling of the store, and the processor is further configured to control the network interface to transmit, when the customer holds the commodity, the first command to the alert device to output the alert.

10. A store management system, comprising:

an alert device installed at a first gate in a store and configured to output an alert; and a store management server configured to communicate with the alert device and including a network interface and a processor configured to:

identify a customer entering the store, acquire customer information about the identified customer, detect that the customer is holding a commodity in the store, acquire sales restriction information about the commodity held by the customer, determine whether the customer is eligible to buy the commodity held by the customer based on the acquired customer information and sales restriction information, and control the network interface to transmit, when it is not determined that the customer is eligible to buy the commodity, a first command to an alert device, wherein the first command causes the alert device to output an alert.

11. The store management system according to claim 10, further comprising:

a first gate control device configured to control the first gate, wherein the processor is further configured to control the network interface to transmit, when it is not determined that the customer is eligible to buy the commodity, a second command to the first gate control device, and the second command causes the first gate control device to close the first gate.

12. The store management system according to claim 11, wherein the processor is further configured to:

store, in a memory, information about the commodity held by the customer, control the network interface to transmit, when it is determined that the customer is eligible to buy the commodity, a third command to the first gate control device, the third command causing the first gate control device to open the first gate, and after the first gate is opened, perform a checkout process based on the information stored in the memory.

13. The store management system according to claim 11, wherein the first gate is located at an exit of the store, and the processor is further configured to:

detect the customer approaching the exit of the store, and control the network interface to transmit, when the customer approaches the exit, the first and second commands to the alert device and the first gate control device, respectively.

14. The store management system according to claim 13, further comprising:

a second gate control device configured to control a second gate in the store, wherein the processor is further configured to, when failing to acquire the customer information about the detected customer, control the network interface to transmit a fourth command to the second gate control device, and the fourth command causes the second gate control device to close the second gate.

15. The store management system according to claim 14, wherein the second gate is located at an entrance of the store.

16. The store management system according to claim 10, wherein the first command causes the alert device to output the alert on a display.

17. The store management system according to claim 10, wherein the first command causes the alert device to output the alert from a speaker.

18. A store management method, comprising:
- identifying a customer entering a store;
- acquiring customer information about the identified customer;
- detecting that the customer is holding a commodity in the store;
- acquiring sales restriction information about the commodity held by the customer;
- determining whether the customer is eligible to buy the commodity held by the customer based on the acquired customer information and sales restriction information; and
- after determining that the customer is not eligible to buy the commodity, issuing a first command that causes an alert device installed at a first gate in the store to output an alert.

* * * * *